United States Patent
Kurz et al.

(10) Patent No.: US 12,015,188 B2
(45) Date of Patent: Jun. 18, 2024

(54) RADAR ANTENNA ASSEMBLY FOR A VEHICLE, VEHICLE, AND METHOD FOR PRODUCING A RADAR ANTENNA ASSEMBLY

(71) Applicants: VOLKSWAGEN AKTIENGESELLSCHAFT, Wolfsburg (DE); SICOYA GMBH, Berlin (DE); FUJIKURA TECHNOLOGY EUROPE GMBH, Frankfurt am Main (DE)

(72) Inventors: Heiko Kurz, Hannover (DE); Hanjo Rhee, Berlin (DE); Stephan Kremers, Heinsberg (DE); Peter Stratmann, Ravensburg (DE)

(73) Assignees: Volkswagen Aktiengesellschaft, Wolfsburg (DE); Fujikura Technology Europe Gmbh, Frankfurt (DE)

( * ) Notice: Subject to any disclaimer, the term of this patent is extended or adjusted under 35 U.S.C. 154(b) by 411 days.

(21) Appl. No.: 17/616,619

(22) PCT Filed: May 28, 2020

(86) PCT No.: PCT/EP2020/064903
§ 371 (c)(1),
(2) Date: Dec. 3, 2021

(87) PCT Pub. No.: WO2020/245033
PCT Pub. Date: Dec. 10, 2020

(65) Prior Publication Data
US 2022/0231402 A1 Jul. 21, 2022

(30) Foreign Application Priority Data
Jun. 3, 2019 (DE) .......................... 102019114883.9

(51) Int. Cl.
*H01Q 1/12* (2006.01)
*G01S 7/03* (2006.01)
(Continued)

(52) U.S. Cl.
CPC ............. *H01Q 1/1271* (2013.01); *G01S 7/03* (2013.01); *G01S 13/931* (2013.01); *H01Q 1/3233* (2013.01); *H01Q 1/40* (2013.01)

(58) Field of Classification Search
CPC .......... H01Q 1/1271; H01Q 1/32; H01Q 1/40; H01Q 1/422; H01Q 1/425; H01Q 1/3233; G01S 7/03; G01S 13/931
See application file for complete search history.

(56) References Cited

U.S. PATENT DOCUMENTS 5,534,879 A * 7/1996 Braun ...................... H01R 4/00
343/711
5,682,168 A * 10/1997 James ................. H01Q 1/3275
343/810

(Continued)

FOREIGN PATENT DOCUMENTS

DE 10246607 A1 4/2004
DE 102016210771 B3 10/2017
(Continued)

OTHER PUBLICATIONS

PCT/EP2020/064903. International Search Report (Sep. 17, 2020).
PCT/EP2020/064903. International Preliminary Report on Patentability (Dec. 7, 2021).

*Primary Examiner* — Peter M Bythrow
(74) *Attorney, Agent, or Firm* — Peter Zura; LOZA & LOZA, LLP

(57) ABSTRACT

A radar antenna assembly for a vehicle, including a composite window pane and at least one radar device designed to transmit and/or receive radar beam. The at least one radar device has an antenna unit and an amplifier unit. The (Continued)

amplifier unit is designed to provide an electrical driver signal for the antenna unit, and/or to receive an electrical echo signal from the antenna unit. The antenna unit may be arranged in the composite window pane of the vehicle, the amplifier unit may be arranged on a surface of the composite window pane, and the antenna unit and the amplifier unit are spatially separate from one another and are electrically interconnected via a connecting element arranged in the composite window pane.

20 Claims, 3 Drawing Sheets

(51) Int. Cl.
*G01S 13/931* (2020.01)
*H01Q 1/32* (2006.01)
*H01Q 1/40* (2006.01)

(56) References Cited

U.S. PATENT DOCUMENTS

| | | | | |
|---|---|---|---|---|
| 5,760,744 | A * | 6/1998 | Sauer | H01Q 9/0407 |
| | | | | 343/700 MS |
| 6,239,758 | B1 * | 5/2001 | Fuchs | H01Q 1/1278 |
| | | | | 343/704 |
| 6,552,690 | B2 * | 4/2003 | Veerasamy | H01Q 1/1271 |
| | | | | 343/711 |
| 7,868,834 | B2 * | 1/2011 | Ortigosa | H01Q 1/3266 |
| | | | | 343/713 |
| 10,135,114 | B2 * | 11/2018 | Niwano | H01Q 21/28 |
| 10,811,760 | B2 * | 10/2020 | Dai | H01Q 5/30 |
| 10,923,795 | B2 * | 2/2021 | Dai | H01Q 13/10 |
| 11,664,576 | B2 * | 5/2023 | Kenichiro | H01Q 1/1271 |
| | | | | 343/700 R |
| 2002/0111149 | A1 * | 8/2002 | Shoki | H01Q 21/30 |
| | | | | 455/277.1 |
| 2003/0034926 | A1 * | 2/2003 | Veerasamy | H01Q 1/36 |
| | | | | 343/711 |
| 2006/0152422 | A1 * | 7/2006 | Kubba | H01Q 1/1271 |
| | | | | 343/700 MS |
| 2012/0256798 | A1 * | 10/2012 | Paulus | H01Q 13/10 |
| | | | | 343/713 |
| 2016/0269059 | A1 * | 9/2016 | Funatsu | H01Q 1/52 |
| 2017/0040662 | A1 * | 2/2017 | Dai | H01Q 5/371 |
| 2019/0302254 | A1 * | 10/2019 | Maruyama | H01Q 1/3233 |
| 2019/0319334 | A1 * | 10/2019 | Dai | H01Q 1/1271 |
| 2020/0052366 | A1 * | 2/2020 | Nagata | H01Q 21/28 |
| 2020/0158817 | A1 * | 5/2020 | Kambe | G01S 13/931 |
| 2020/0176872 | A1 * | 6/2020 | Baranski | H01P 3/081 |
| 2021/0028531 | A1 * | 1/2021 | Dardenne | H01Q 9/40 |

FOREIGN PATENT DOCUMENTS

| | | |
|---|---|---|
| EP | 3609022 A1 | 2/2020 |
| FR | 2235502 A1 | 1/1975 |
| JP | H09502073 A | 2/1997 |
| JP | 2002237779 A | 8/2002 |
| JP | 2010158035 A | 7/2010 |
| JP | 2015133004 A | 7/2015 |
| JP | 2018182734 A | 11/2018 |

* cited by examiner

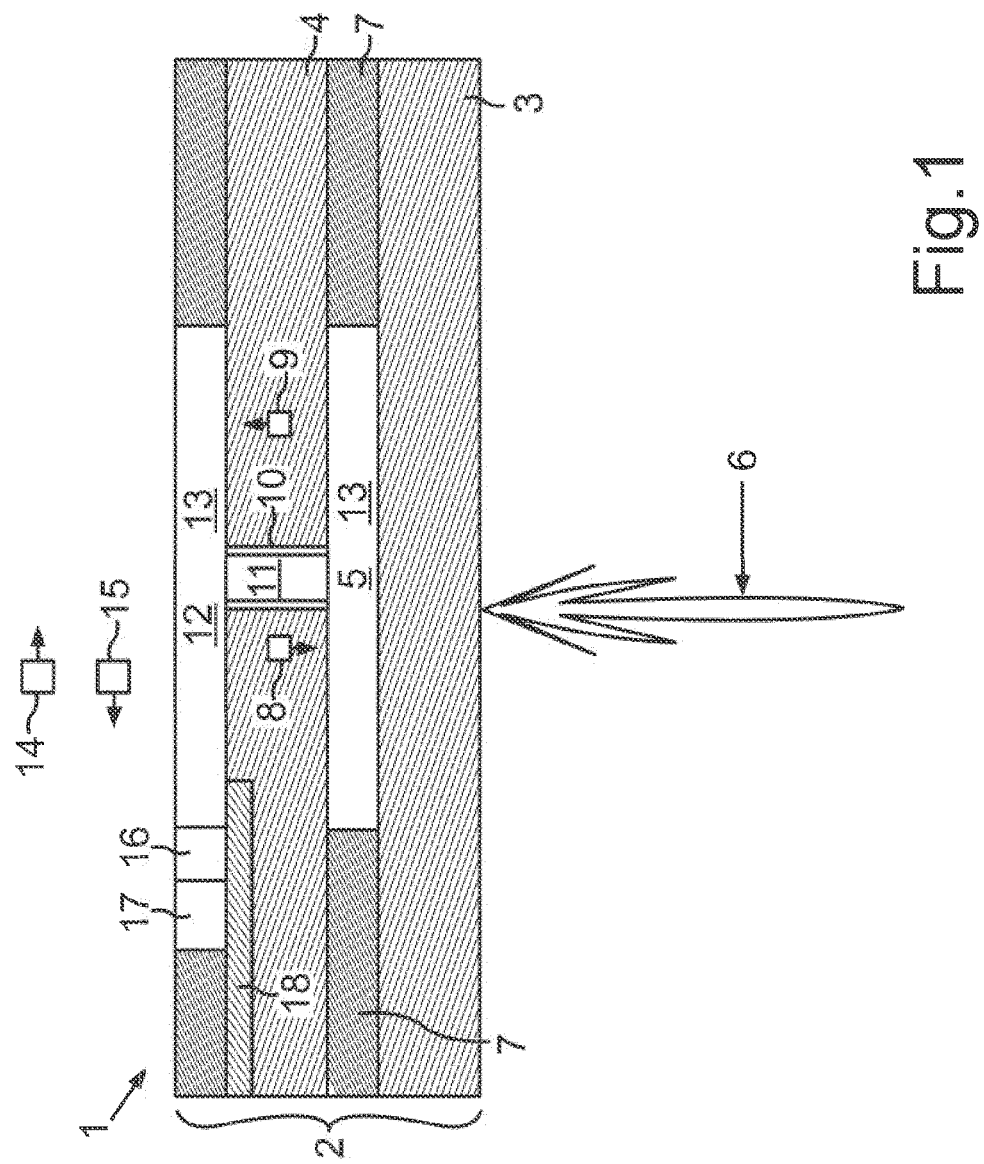

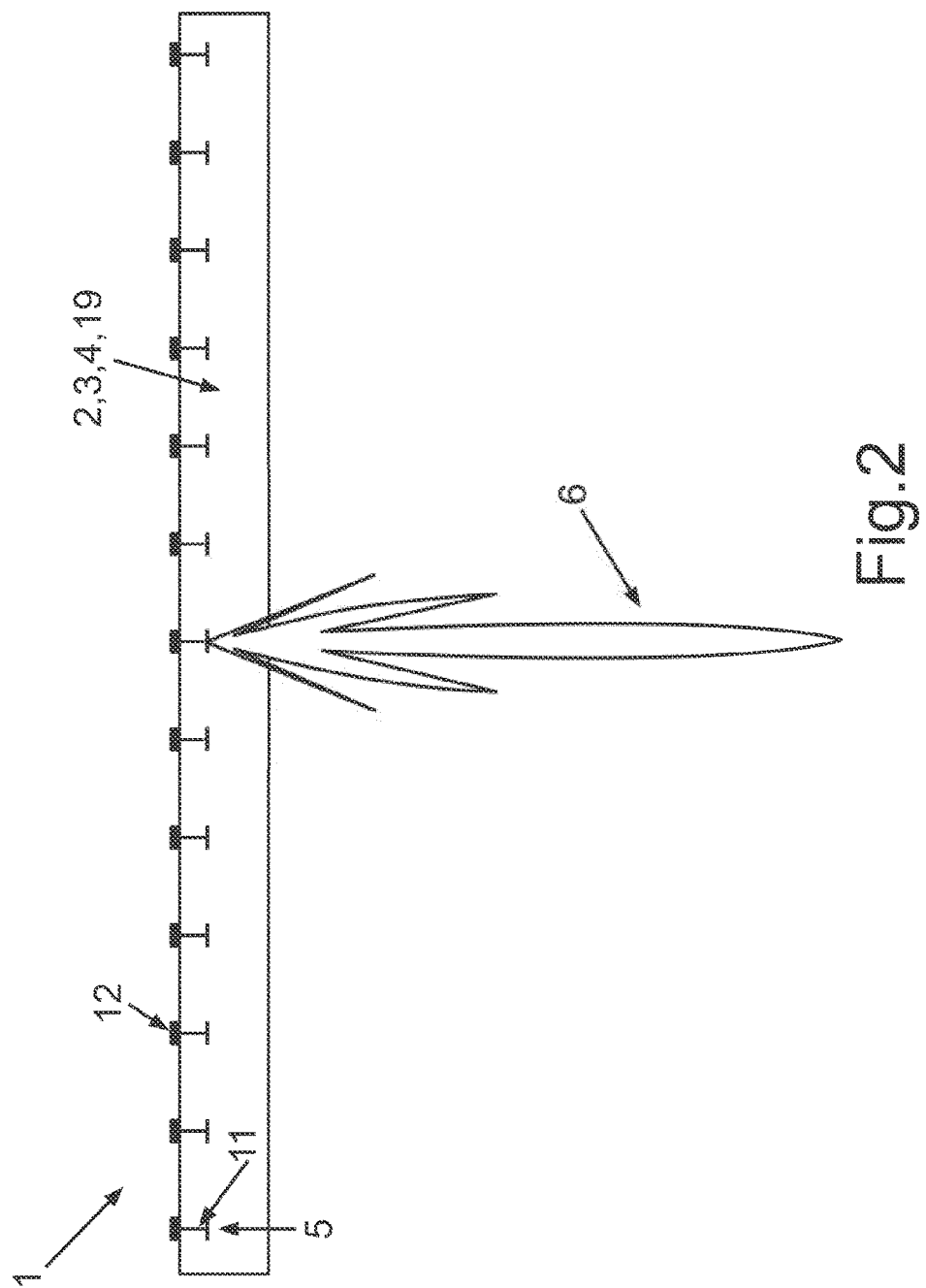

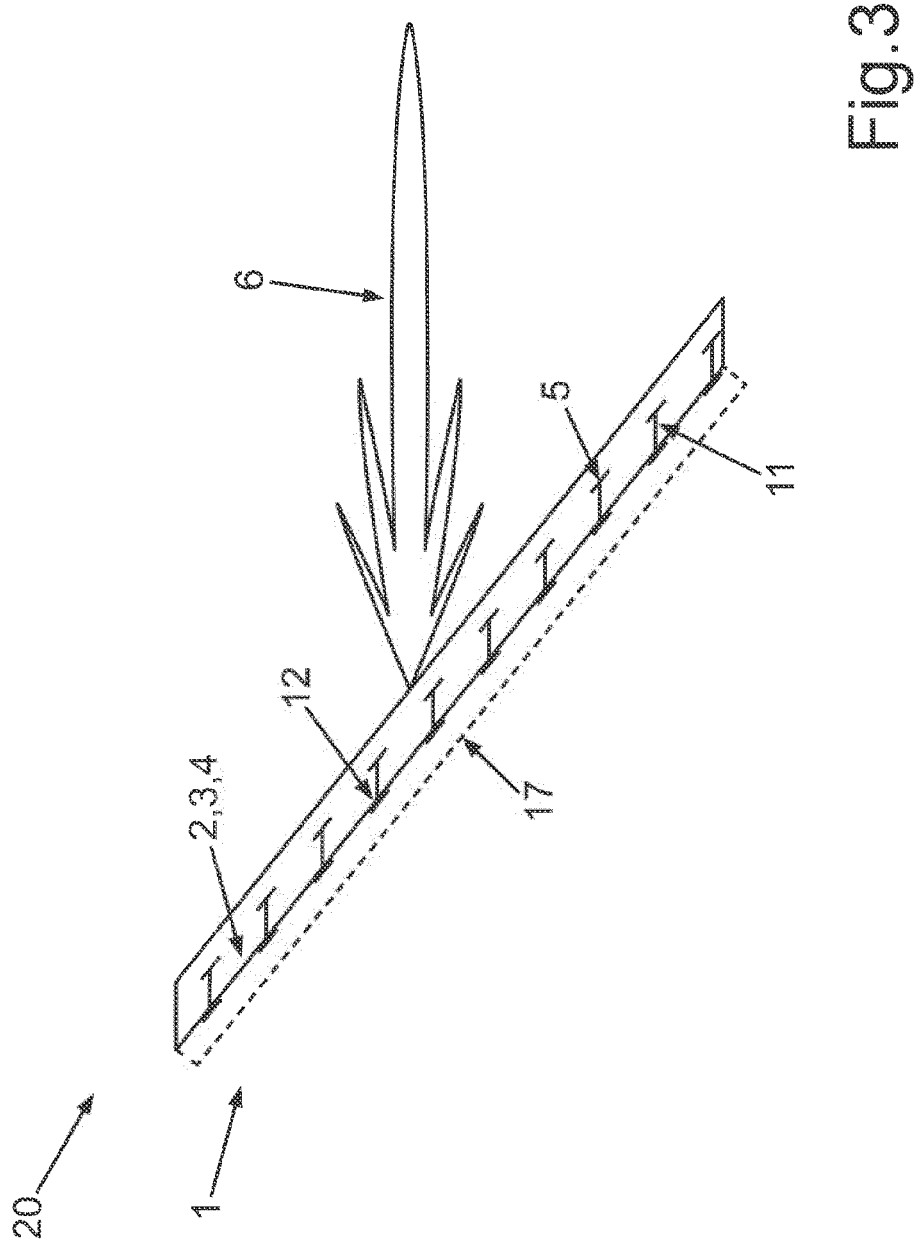

RADAR ANTENNA ASSEMBLY FOR A VEHICLE, VEHICLE, AND METHOD FOR PRODUCING A RADAR ANTENNA ASSEMBLY

CROSS REFERENCE TO RELATED APPLICATION

The present application claims priority to International Patent App. No. PCT/EP2020/064903 to Kurz, et al., titled "Radar Antenna Assembly for a Vehicle, Vehicle, and Method for Producing Radar Assembly", filed May 28, 2020, which claims priority to German Patent App. No 10 2019 114 883.9, filed Jun. 3, 2019, the contents of each being incorporated by reference in their entirety herein.

FIELD OF TECHNOLOGY

The present disclosure relates to a radar antenna assembly for a vehicle, to a vehicle, and to a method for manufacturing a radar antenna assembly.

BACKGROUND

Various techniques are employed for environmental capture of a motor vehicle. These techniques for example include an optical capture of the environment via cameras, a capture by means of LIDAR systems or a capture by means of radar sensor technology. In the radar sensor technology, the fact is advantageous that they are not affected by poor visibility conditions in contrast to LIDAR or camera systems. Thus, an accurate capture of the environment by radar sensors is also possible in darkness or fog.

In order to obtain a high resolution, however, it is required to provide radar antenna assemblies, which comprise a plurality of radar units. In addition, for achieving the required angular accuracy, it is necessary to provide a certain surface for the radar antenna assembly. Radar antenna assemblies allow environmental capture via determination of the phase position of a signal, which is received by the respective radar antenna units. Therein, two principal problems result. The first problem is in the synchronization of the individual radar antenna units. Since the determination of the angle of incidence of a signal is determined via the phase position, it is required that a point of time of signal reception is determined with a required accuracy. A further problem results from the arrangement of the individual radar antenna units among each other. Thus, it is required to determine the accurate position of the individual radar antenna units among each other. A windscreen of a motor vehicle lends itself as a suitable surface for a radar antenna assembly because it provides a required surface and allows a rigid arrangement of the individual radar antenna units.

For example, DE 10 246 607 B4 discloses an electrochromic radar sensor. The electrochromic radar sensor includes an electrochromic layer arrangement. Therein, a radar sensor assembly is provided in a passage direction of an electromagnetic wave originating from an observed object.

FR 2 235 502 A1 discloses a device for capturing or emitting various electromagnetic waves, which are used in radio broadcasting, television broadcasting or for radar. It is provided to integrate a strip or a powder of conductive material in a mass, which is applied or adhered to a surface.

U.S. Pat. No. 5,682,168 A discloses a hidden vehicle antenna. Therein, it is provided to provide one or multiple antenna elements below an encased cover above a roof girder of a vehicle or behind a front grille of the vehicle.

SUMMARY

It is an object of the present disclosure to allow providing radar antenna units in a window pane of a vehicle.

According to the present disclosure, a radar antenna assembly for a vehicle is provided. The radar antenna assembly comprises a compound window pane and at least one radar device, which is configured for transmitting and/or receiving radar beams. The at least one radar device comprises a respective antenna unit and a respective amplifier unit. The amplifier unit is configured to provide an electrical driver signal for the antenna unit and/or to receive an electrical echo signal from the antenna unit. The antenna unit of the antenna device is arranged in the compound window pane of the vehicle. The amplifier unit is arranged on a surface of the compound window pane. The antenna unit and the amplifier unit are spatially separated from each other and connected to each other in electrically conducting manner via a connecting element arranged in the compound window pane.

In other words, the radar antenna assembly comprises the compound window pane, wherein the compound window pane can for example be a windscreen of the vehicle. The compound window pane can comprise multiple layers, which are attached to each other. Therein, the antenna unit of the radar device is arranged within the compound window pane. Thus, it is for example arranged between two layers of the compound window pane or integrated in a layer. On an outer side of the compound window pane, the amplifier unit of the radar device is arranged. The amplifier unit and the antenna unit are spatially separated from each other such that they do not contact each other. The amplifier unit is configured to provide the electrical driver signal, which is to be transmitted by the antenna unit. For this purpose, the amplifier unit is connected to the antenna unit in electrically conducting manner via the connecting element. The connecting element is also configured to communicate an electrical echo signal received by the antenna unit to the amplifier unit.

By the present disclosure, the advantage arises that an arrangement of a radar antenna assembly in a compound window pane is allowed.

The present disclosure also includes additional aspects, by which additional advantages arise.

In some examples, the present disclosure provides that the compound window pane comprises at least two glass layers, wherein the antenna unit is arranged between the glass layers. In other words, the compound window pane is a multilayer arrangement, which comprises the at least two glass layers. The glass layers are arranged on each other, wherein the at least one antenna unit is located between the glass layers. For example, it can be provided that the at least two glass layers are connected to each other by means of synthetic resin, wherein the antenna unit is incorporated in the synthetic resin arranged between the two glass layers.

In some examples, the present disclosure provides that the connecting element is arranged in a bore in the compound window pane. In other words, the compound window pane comprises a bore, which extends through at least one layer of the compound window pane. The connecting element for electrically contacting the amplifier unit with the antenna unit is arranged in this bore. For example, it can be provided that the bores extend from the surface of the compound window pane up to the antenna element and are filled with an electrically conducting material.

In some examples, the present disclosure provides that the connecting element is arranged perpendicular to the antenna unit. In other words, the connecting element extends parallel to a normal of a surface of the antenna unit. Thereby, an advantage arises that radiation, which affects the radiation provided by the antenna unit, is not radiated by the connecting element. For example, it can be provided that the antenna unit comprises a rod antenna or a patch antenna, which is arranged within a plane of the compound pane. The connecting element can be arranged normal to this antenna unit.

An aspect of the present disclosure provides that the compound window pane comprises at least one foil layer, wherein the antenna unit is printed onto the foil layer. In other words, the antenna unit is provided on a foil layer of the compound window pane. The shape of the antenna unit can be provided by means of application of electrically conducting material onto the foil layer by means of a printing method. Thereby, an advantage arises that complex structures of the antenna unit can be provided via a widespread and simple method. For example, it can be provided that the foil layer is composed of a polymer, wherein the antenna unit has been applied by means of an inkjet printing or screen printing method.

Another aspect of the present disclosure provides that one of the glass layers is coated with the antenna unit. In other words, the antenna unit is directly applied to a glass layer. Thereby, the advantage arises that an additional layer does not have to be provided. For example, it can be provided that the antenna element has been applied to the glass layer by means of an atomization or an evaporation method. For providing a predetermined structure of the antenna unit, a mask can be placed on the compound window pane during the coating method or subsequent etching for ablating an applied layer can be effected.

Another aspect of the present disclosure provides that the compound window pane comprises at least one optical guide, wherein the at least one optical guide is connected to the amplifier unit by means of an optical coupling element. In other words, the compound window pane includes a volume, which is configured for optically guiding light signals. The optical coupling element, which mirrors at least a part of the light of a light signal, which is guided by the optical guide, into the amplifier unit, is located at the amplifier unit. In accordance with these aspects, the advantage arises that an additional attachment of an optical guide outside of the compound window pane is not required. For example, it can be provided that a certain material is incorporated along a direction of the compound window pane, which differs from the material of a glass layer. Due to the different refractive indices, light can be guided along the optical guide. In order that a part of the guided light can be supplied to the amplifier unit, an optical coupling element can be arranged on the optical guide, which guides a part of the light into the amplifier unit.

Another aspect of the present disclosure provides that one of the glass layers comprises conductor paths, which electrically contact the amplifier unit. In other words, the glass layer comprises paths of an electrically conductive material, which are connected to the amplifier unit in electrically conducting manner to supply it with current. In accordance with these aspects, the advantage arises that contacting the amplifier unit via the compound pane is allowed.

A vehicle with the radar antenna assembly also belongs to the present disclosure. The motor vehicle can, for example, be a passenger car or a truck.

The present disclosure also includes a method for manufacturing a radar antenna assembly for a vehicle. The radar antenna assembly to be manufactured comprises a compound window pane and at least one radar device configured for transmitting and/or receiving radar beams, wherein the at least one radar device comprises a respective antenna unit and a respective amplifier unit. The amplifier unit is configured to provide an electrical driver signal for the antenna unit and/or to receive an electrical echo signal from the antenna unit. In the method, it is provided that the antenna unit and a connecting element are arranged in the compound window pane. The amplifier unit is arranged on a surface of the compound window pane. In the method, the antenna unit and the amplifier unit are connected to each other in electrically conducting manner via the connecting element arranged in the compound window pane.

In other words, the radar antenna assembly includes the at least one radar device, wherein the antenna unit of the radar device is arranged during the method such that it is located in the compound window pane. For example, this can be effected in that the antenna unit is arranged on a first glass layer, which is covered with a second glass layer. Thereby, the antenna unit can be located between the two glass layers such that it is thus arranged within the compound window pane. In order that the antenna unit can be electrically connected to the amplifier unit, it is provided to arrange the connecting element in the compound window pane during the method. For example, this can be effected via drilling a hole into one of the glass layers with subsequent arrangement of the connecting element in the hole. In a last step, the amplifier unit can be arranged on the compound window pane and connected to the antenna unit via the connecting element. For this purpose, the amplifier unit can for example be soldered to the connecting element.

Developments of the vehicle according to the present disclosure and of the method according to the present disclosure, which comprise features as they are described in context of the developments of the radar antenna assembly according to the present disclosure, also belong to the present disclosure. For this reason, the corresponding developments of the vehicle according to the present disclosure and of the method according to the present disclosure are not again described here.

The present disclosure also includes the combinations of the features of the described embodiments.

BRIEF DESCRIPTION OF THE DRAWINGS

Below, an embodiment of the present disclosure is described. Hereto, there shows:

FIG. 1 a radar antenna assembly for a vehicle according to some aspects of the present disclosure;

FIG. 2 shows a radar antenna assembly in a compound window pane according to some aspects of the present disclosure; and FIG. 3 shows a further radar antenna assembly in a compound window pane according to some aspects of the present disclosure.

DETAILED DESCRIPTION

Examples explained below are preferred embodiments of the present disclosure. In the embodiments, the described components of the embodiment each represent individual features of the present disclosure to be considered independently of each other, which each also developing the present disclosure independently of each other and thereby also to be regarded as a constituent of the present disclosure in individual manner or in a combination different from the shown one. Furthermore, the described embodiments can also be supplemented by further ones of the already described features.

In the figures, functionally identical elements are each provided with the same reference characters.

FIG. 1 shows a radar antenna assembly for a vehicle. The radar antenna assembly 1 can include a compound window pane 2. The compound window pane 2 can for example comprise a first glass layer 3 and a second glass layer 4. An antenna unit 5 can be arranged between the first glass layer 3 and the second glass layer 4, which can be configured for transmitting and/or receiving radar beams 6. The antenna unit 5 can for example be composed of gold, silver, copper, aluminum or any other electrically conducting material. The antenna unit 5 can, for example, be applied to the first glass layer 3 by means of an evaporation method or an atomization method. The antenna unit 5 can have a predetermined geometry and for example be configured as a patch antenna or rod antenna. For providing the geometry, the antenna unit 5 can be applied by means of a mask. It can also be provided that the first glass layer 3 has been completely coated with a material and unnecessary areas have been ablated by means of etching methods or atomization methods for obtaining the antenna unit 5.

The second glass layer 4 can be arranged on the first glass layer 3 by means of a synthetic resin 7. In order to be able to supply the antenna unit 5 with an electrical driver signal 8 or to be able to pass an electrical echo signal 9 received by the antenna unit 5, it can be provided that a bore 10 is provided in the second glass layer, which has been manufactured by means of a drill or a laser. A connecting element 11 can be arranged in the bore 10, which can be manufactured by an input of an electrically conducting material into the bore 10. The antenna unit 5 can be connected to an amplifier unit 12 in electrically conducting manner via the connecting element 11 and together form the radar device 13. The amplifier unit 12 can be arranged on a surface of the second glass layer 4. The amplifier unit 12 can be configured to receive optical driver signals 14, to convert them into the electrical driver signal 8 and to supply them to the antenna unit 5 via the connecting element 11. The amplifier unit 12 can be configured to receive an electrical echo signal 9 via the connecting unit 11 and to convert it into an optical echo signal 15.

The amplifier unit 12 can be connected to an optical light guide 17 via an optical coupling element 16. The optical coupling element 16 can be configured to allow a coupling of an optical driver signal 14 from the optical light guide 17 into the amplifier unit 12 or to allow a coupling of the optical echo signal 15 from the amplifier unit 12 into the optical light guide 17. The optical light guide 17 can for example be composed of glass fiber and be arranged on the second glass layer 4. The optical coupling element 16 can for example be grating couplers, butt couplers or adiabatic couplers. Metallic conductor paths 18 can be arranged in the second glass layer 4 to supply the amplifier unit 12 with electrical current or to dissipate heat from the amplifier unit 12.

FIG. 2 shows a radar antenna assembly in a compound window pane. The radar antenna assembly 1 includes multiple radar devices 13, which comprise a respective antenna unit 5 and a respective amplifier unit 12, which are arranged spaced from each other and are connected to each other via a respective connecting element 11. It can be provided that the antenna units 5 have been applied to a foil by means of a printing method. The foil 19 can be adhered to the first glass layer 3. The second glass layer 4 can be arranged on the foil 19 itself. Respective amplifier units 12 can be arranged on a surface of the second glass layer 4.

FIG. 3 shows a radar antenna assembly in a compound window pane. The antenna units 5 can for example be configured as rod antennas. The connecting units 11 can connect the antenna units 5 to the respective amplifier units 12 in electrically conducting manner, wherein the connecting units 11 can be arranged normal to the compound window pane 2. Hereby, it is avoided that portions of radiated electromagnetic fields of the connecting units 11 affect the electromagnetic fields of the antenna units 5. The amplifier units 12 can be optically connected via the optical light guides 17. The antenna assembly 1 can for example be arranged in a vehicle 20, wherein the vehicle 20 can for example be a passenger car or a truck. The compound window pane 2 can for example be a front or a rear window of the vehicle 20.

The novel radar antenna assembly 1 utilizes photonically integrated amplifier units 12 (so-called radar chips) to span a large radar array. The amplifier units 12 can be arranged behind the windscreen. Herein, amplifier units 12 and antenna units 5 are separated such that only the antenna units 5 are integrated in the front window. Therein, the high-frequency connection (the connecting element 11) between the amplifier unit 12 and the respective antenna unit 5 is produced by a bore (mechanically or by laser), which is filled with a conducting material.

By the direct integration of the antenna units 5 in the compound window pane 2, a highly precisely arranged antenna array can be manufactured, which allows spatial dimensions of above one meter and thus allows angular separabilities of 0.1° and below. Therein, the integration of the antenna units 5 can for example be effected by the following methods:

An embodiment can provide prefabrication and insertion of the antenna units 5 into a multilayer arrangement (sandwich structure) of glass layers 3, 4 of the compound window pane 2. Subsequently, the individual glass layers 3, 4 of the compound window pane 2 can be combined, whereby the antenna units 5 are fixed in their position at the same time. For that, the antenna units 5 can be prefabricated and inserted into the compound window pane 2 between glass layers 3, 4.

A further embodiment can provide metal evaporation of a pane side of the first glass layer 3 and a subsequent material ablation for obtaining the antenna units 5 with predetermined antenna geometries (by laser, sputtering, etching or the like). Metallic conductor paths 18 can be integrated in the compound window pane 2 for electrically contacting the amplifier units 12. Alternatively, the uppermost glass layer 4 can be also etched away at the location, at which the amplifier unit 12 is seated, such that the amplifier unit 12 is connected to a structured metallized surface by flip chip. The conductor paths 18 can also be employed for cooling the amplifier units 12.

An implementation provides printing of the antenna units 5 onto foil and integration in the compound window pane 2. Herein, the individual amplifier units 12 are synchronized by an optical fiber. It also serves for signal transfer of the radar signals to be transmitted (Tx) and received (Rx) at optical frequencies. Alternatively to individual glass fiber lines, waveguides can also be directly introduced into the glass (PLC) in the above described implementation. They pass the Tx and Rx radar signals converted into the optical frequency range to the individual amplifier units 12. Optically contacting the amplifier units 12 with the waveguide could occur by means of grating couplers, butt coupling or adiabatic couplers. Thereby, there could be an individual optical coupling location in the front window, which distributes all of the signals of the radar chips.

For automatically driving, environmental capture as secure as possible is indispensable. Therein, the environment is captured with the aid of sensors like radar, lidar and camera. An integral 360° 3D capture of the environment is particularly important such that all of the static and dynamic objects are captured. In particular, a leading part is accrued to the lidar in the redundant, robust environmental capture since this sensor type can precisely measure distances in the environmental capture and can also be employed for classification. However, these sensors are cost-intensive and expensive in their construction. In particular the 360° 3D environmental capture is problematic since either many smaller individual sensors are required to ensure it, which usually operate with many individual light sources and detector elements, or large sensors are installed. However, the smaller sensor types are also still in the range of 10×10×10 cm³ in their spatial dimensions and do not allow a visible installation position up to now.

Furthermore, the data individually collected by each sensor has to be individually processed and/or fused. Therein, the accurate time stamping is in particular important for the real-time processing, which additionally makes the data capture and classification expensive.

In the area of the passive safety systems as well as for automatically driving at level four and five, the discriminability of the traffic participants is of particular importance both for the protection of the occupants and of the traffic participants. Thereto, the secure environmental capture is indispensable. In order to guarantee this, the environment has to be perceived with a resolution as high as possible in all of the three spatial dimensions. Modern camera and LIDAR systems are capable of ensuring this environmental capture, but are affected in their quality or completely fail in poor visibility conditions like fog, snow or in darkness. In contrast, radar sensors are not subject to these limitations, but have to be arranged in an array arrangement with a plurality of different sensors for 3D imaging with high resolution. Moreover, they have to be synchronized with respect to their transmission and reception time, which is technically extremely challenging. Therefore, it is advantageous if the individual radar sensors are as small, simple, flexible, error-tolerant, robust and inexpensive as possible. For this purpose, as little electronics as possible has to be installed on the radar sensor itself, and the digital data processing has to occur in decentralized manner within a central control unit.

Conventional radar systems in series production have an angle separability in azimuth of 10° to 4°. The angular separability in elevation is usually even lower such that imaging methods cannot be used for radar data. The angular separability of current LiDAR systems is in the range of 0.1°, which cannot be achieved with current radar systems.

Current radar sensors, which are installed in the car, mostly have dimensions of 10×10 cm. The maximum angular resolution achieved thereby is ca. 2° and only allows 2D environmental capture. The current radar sensors have too large spatial dimensions with small aperture for vehicles, from which a too low resolution power results. It does not allow sufficient environmental capture for autonomously driving. The installation of multiple sensors requires the temporal synchronization thereof, which is technically challenging and cost-intensive. Nanoradars have dimensions in the range of 5×5 cm and can be easier integrated in the vehicle by their compact construction. Nanoradars have the same disadvantages. Moreover, the range of the nanoradars is currently limited to 45 m, which is too low in particular for intraurban scenarios. The resolution power can be increased up to the cm range by means of the synthetic aperture method (English: "Synthetic Aperture Radar", SAR). The SAR method is only possible perpendicular to the direction of travel. A foresight into or opposite to the direction of travel is not possible with this method. In addition, the data processing required after the measurement is very computationally intensive.

The installation of many electronic components within the sensors increases the spatial dimensions and costs thereof such that the use of multiple sensors is not implementable. Moreover, the temporal synchronization of the sensors is technically challenging. If the aperture is to occur by distribution of the antennas and subsequent decentral digital data processing within a central control unit, however, the electrical transfer of the transmit and receive signal is problematic since the losses would be several dB.

Furthermore, it is required to use multiple individual sensors. Large spatial dimensions of the sensors do not allow a concealed installation on a vehicle such that they remain visible. By the use of multiple individual sensors, a relatively high effort for synchronization of the individual sensors is required. In addition, the data fusion is expensive and prone to error since a central data capture is not effected, but each individual sensor itself captures and forwards the data. High costs result from it.

In contrast, the antenna assembly according to the present disclosure includes a plurality of advantages with respect to the prior art. Overall, it is more inexpensive than known solutions. The arrangement of the radar device in a compound window pane allows high precision in the manufacture because the compound window pane is relatively rigid compared to metal sheet. A simple integration of the antenna assembly in the vehicle is allowed. The manufacture is effected using established technologies, which are available in mass production and largely developed. A simple construction is allowed. A reduction of the number of individual sensors can be effected, whereby the calibration can be simplified. A concealed installation becomes possible. The large surface of the assembly allows an angular separability of $<=0.1°$ extremely high for radar.

Overall, the example shows how providing radar antenna units in a window pane of a vehicle is allowed by the present disclosure.

LIST OF REFERENCE CHARACTERS

1 Radar antenna assembly
2 compound window pane
3 first glass layer
4 second glass layer
5 antenna unit
6 radar beams
7 synthetic resin
8 electrical driver signal
9 electrical echo signal
10 bore
11 connecting unit
12 amplifier unit
13 radar device
14 optical driver signal 15 optical echo signal
16 coupling element
17 light guide
18 conductor paths
19 foil
20 vehicle

The invention claimed is:

1. A radar antenna assembly for a vehicle, comprising:
a compound window pane; and
at least one radar device configured to communicate radar beams, the at least one radar device comprising a respective antenna unit and a respective amplifier unit for each radar device, each antenna unit being configured in the compound window pane, and each amplifier unit being configured on a surface of the compound window pane, wherein each antenna unit and amplifier unit are spatially separated from each other, and electrically coupled to each other via a connecting element arranged in the compound window pane,
wherein each amplifier unit is configured to provide an electrical driver signal for the antenna unit and/or to receive an electrical echo signal from the antenna unit.

2. The radar antenna assembly according to claim 1, wherein the compound window pane comprises at least two glass layers, and wherein the antenna unit is arranged between the glass layers.

3. The radar antenna assembly according to claim 2, wherein at least one of the glass layers is coated with the antenna unit.

4. The radar antenna assembly according to claim 2, wherein at least one of the glass layers comprises metallic conductor paths, which electrically contact the amplifier unit.

5. The radar antenna assembly according to claim 1, wherein the connecting element is arranged in a bore in the compound window pane.

6. The radar antenna assembly according to claim 1, wherein the connecting element is arranged perpendicular to the antenna unit.

7. The radar antenna assembly according to claim 1, wherein the compound window pane comprises at least one foil layer, and wherein the antenna unit is printed onto the foil layer.

8. The radar antenna assembly according to claim 1, wherein the compound window pane comprises at least one optical light guide, and wherein the at least one optical light guide is coupled to the amplifier unit via an optical coupling element.

9. A method for manufacturing a radar antenna assembly for a vehicle, comprising:
forming a compound window pane;
forming at least one radar device configured to communicate radar beams, the at least one radar device comprising a respective antenna unit and a respective amplifier unit for each radar device, each antenna unit being configured in the compound window pane, and each amplifier unit being configured on a surface of the compound window pane, wherein each antenna unit and amplifier unit are spatially separated from each other, and electrically coupled to each other via a connecting element arranged in the compound window pane,
wherein forming the at least one radar device comprises configuring each amplifier unit to provide an electrical driver signal for the antenna unit and/or to receive an electrical echo signal from the antenna unit.

10. The method according to claim 9, wherein forming the at least one radar device comprises forming the compound window pane to include at least two glass layers, and wherein the antenna unit is arranged between the glass layers.

11. The method according to claim 10, wherein forming the at least one radar device comprises coating at least one of the glass layers with the antenna unit.

12. The method according to claim 10, wherein at least one of the glass layers comprises metallic conductor paths, which electrically contact the amplifier unit.

13. The method according to claim 9, wherein forming the at least one radar device comprises arranging the connecting element in a bore in the compound window pane.

14. The method according to claim 9, wherein forming the at least one radar device comprises arranging the connecting element perpendicular to the antenna unit.

15. The method according to claim 9, wherein the compound window pane comprises at least one foil layer, and wherein the antenna unit is printed onto the foil layer.

16. The method according to claim 1, wherein the compound window pane comprises at least one optical light guide, and wherein the at least one optical light guide is coupled to the amplifier unit via an optical coupling element.

17. A radar antenna assembly for a vehicle, comprising:
a compound window pane; and
at least one radar device configured to communicate radar beams, the at least one radar device comprising a respective antenna unit and a respective amplifier unit for each radar device, each antenna unit being configured in the compound window pane, and each amplifier unit being configured on a surface of the compound window pane,
wherein each antenna unit and amplifier unit are spatially separated from each other, and electrically coupled to each other via a connecting element arranged in the compound window pane,
wherein the compound window pane comprises at least two glass layers, and wherein the antenna unit is arranged between the glass layers, and
wherein each amplifier unit is configured to provide an electrical driver signal for the antenna unit and/or to receive an electrical echo signal from the antenna unit.

18. The radar antenna assembly according to claim 17, wherein at least one of the glass layers is coated with the antenna unit.

19. The radar antenna assembly according to claim 17, wherein the compound window pane comprises at least one foil layer, and wherein the antenna unit is printed onto the foil layer.

20. The radar antenna assembly according to claim 17, wherein the compound window pane comprises at least one optical light guide, and wherein the at least one optical light guide is coupled to the amplifier unit via an optical coupling element.

* * * * *